United States Patent [19]

Clark

[11] Patent Number: 4,876,511
[45] Date of Patent: Oct. 24, 1989

[54] METHOD AND APPARATUS FOR TESTING AND CALIBRATING AN ELECTROMAGNETIC LOGGING TOOL

[75] Inventor: Brian Clark, Missouri City, Tex.

[73] Assignee: Schlumberger Technology Corporation, Houston, Tex.

[21] Appl. No.: 260,536

[22] Filed: Oct. 20, 1988

[51] Int. Cl.$^4$ .................... G01V 13/00; G01V 3/28; G01V 3/30
[52] U.S. Cl. .................... 324/338; 324/202
[58] Field of Search .................... 324/202, 338–343

[56] References Cited

U.S. PATENT DOCUMENTS

| | | | |
|---|---|---|---|
| 2,633,484 | 3/1953 | Zimmerman | 324/202 X |
| 3,398,356 | 8/1968 | Still | 324/338 |
| 4,144,486 | 3/1979 | Kaye et al. | 324/326 |
| 4,649,344 | 3/1987 | Moll et al. | 324/202 X |

Primary Examiner—Gerard R. Strecker
Attorney, Agent, or Firm—Stephen L. Borst

[57] ABSTRACT

A method and apparatus for testing and calibrating an electromagnetic logging tool are described. The tool includes a tansmitting antenna and a receiving antenna. A shielded receiving device is placed around the transmitting antenna and intercepts the transmitted signal. A shielded transmitting device is positioned around the tool's receiving antenna and transmits to the receiving antenna a signal which has a phase and/or an amplitude related to the signal transmitted by the tool's transmitting antenna in a known manner which simulates the effects that a geological formation would have on the signal if it were to travel from the tool's transmitting antenna to the tool's receiving antenna through the formation. Since the simulated effect is known, the output of the tool may be verified as being correct or corrected if erroneous.

14 Claims, 2 Drawing Sheets

METHOD AND APPARATUS FOR TESTING AND CALIBRATING AN ELECTROMAGNETIC LOGGING TOOL

The present invention relates to a method and apparatus for testing and calibrating electromagnetic tools used in wireline logging or used in logging-while-drilling. Fixtures are attached to the transmitters and receivers of an electromagnetic logging tool in order to prevent electromagnetic fields from tool transmitting antenna from directly reaching the receiving antennas. The fixtures contain secondary antennas which detect electromagnetic fields at the transmitters and re-broadcast electromagnetic fields at the receivers. The re-broadcast electromagnetic fields have specific phases and amplitudes chosen for testing and/or calibrating the logging tool.

BACKGROUND OF THE INVENTION

Electromagnetic logging devices for determining the electrical properties of subsurface formations are well known. For example, U.S. Pat. Nos. 4,209,747 (Huchital) and 4,511,843 (Thoraval) describe electromagnetic propagation tools used to measure the dielectric constant and the conductivity of formations surrounding the borehole of an oil well. These tools launch an electromagnetic signal into the formation and detect the signal after it has propagated through a known distance to one or more receivers where the phase and/or amplitude of the signal is measured. Since formations of differing dielectric and conductivity properties cause the phase and amplitude of the propagating signal to be modified by various amounts, the dielectric and conductivity properties of the formation may be deduced. U.S. Pat. No. 4,651,101 (Barber, Chandler, and Hunka) describes an induction logging tool with metallic support used to measure the conductivity of the formation surrounding the borehole of an oil well. Co-pending U.S. patent application No. 115,503 to B. Clark, M. Luling, J. Jundt, and M. Ross describes an electromagnetic logging device which provides two or more radial depths of investigation. The electromagnetic logging devices described in these patents have the following features in common; several antennae disposed along the length of an elongated tube, one or more antennae acting as transmitters of electromagnetic radiation, and two or more antennae acting as receivers or detectors of electromagnetic radiation.

An important practical consideration in the logging of the electrical properties of geological formations is that of providing a method for testing and calibrating the electromagnetic logging device immediately before logging, and immediately after logging the oil well. Such testing/calibration is best performed on the oil well rig floor to assure the proper, contemporaneous operation of the tool. This calibration is required to determine whether the transmitting and receiving antennae are operating correctly, to determine the threshold signal detectable at each receiver, and to check the electronic circuitry used to power the transmitters and the electronics used to measure the phases and/or the amplitudes of the signals at the receivers. In order to calibrate electromagnetic logging tools such as described in the above patents, it is necessary to induce an electromagnetic field with a known phase and known amplitude at each receiving antenna. The expected phases and amplitudes can be compared to the measured phases and amplitudes, and the differences can be used to correct any subsequent (or previously obtained) readings If the readings are too different from the expected values, then the tool is not functioning correctly, and would not be run in the well.

The present invention provides a method and apparatus for testing/calibrating electromagnetic logging devices at the wellsite immediately before and after logging the well. The simplest and most often used previous method for testing electromagnetic tools has been to operate the tools with the antennae directed into air. The resulting phase and amplitudes measured by the receivers were then compared to those values expected for an electromagnetic field radiated in air. This could be performed on the rig floor, but the close proximity of metal objects would interfere with the radiated field thereby introducing an uncertainly in the test/calibration Another disadvantage with this method has been that the dielectric constant of air is unity and its conductivity is zero, so air is not representative of the conditions encountered in any subsurface geological formations.

Typical values for the dielectric constant of geological formations lie in the range of 5 to 50, and typical values for the conductivity of formations lie in the range of 0.001 to 10 mhos/meter. Normally, the phases and amplitudes measured with an air test lie outside the normal range of values expected when logging typical formations. Furthermore, the electromagnetic wave travels from the transmitting antennas to the receiving antennas with very little attenuation, so the automatic gain control functions of the tool's electronics were not adequately tested with the previous air technique.

Previously a technique for the calibration of an Electromagnetic Propagation Tool has been proposed and employed for the calibration of a logging tool known as the EPT tool. This tool comprises a pad which is pressed against the borehole wall and includes a transmitter and two receivers for detecting phase shift and attenuation The operating frequency of the EPT tool is 1.1 GHz so that the spacing between the transmitter and the receivers and between the two receivers is quite small when compared to the spacings of electromagnetic propagation tools whose operating frequency is in the range of from 0.1 MHz to 10 MHz. This prior technique calls for the installation of a conductive barrier between the two receivers which serves to introduce a specified phase shift and attenuation therebetween. A variety of barriers of varying heights and thicknesses may then be utilized to simulate the effects of a range of phase shifts and attenuations that might be expected from a variety of geological formations.

The above described technique is effective for logging tools such as the EPT tool which have high operating frequencies and short spacings between the transmitter and the receivers (on the order of inches). Interference to the transmitted electromagnetic fields by neighboring metallic objects can be avoided by tools having short spacings merely by assuring that the tool being calibrated is no closer to such objects than a few feet. Tools that operate at lower frequencies with much longer transmitter - receiver spacings, however, are much more likely to be subject to interference when located on the floor of a drilling rig since nearby metallic equipment, such as the drilling derrick or the floor itself effects the operation of the tool. Additionally, as previously mentioned, it would be desirable to have a calibration technique that is performed at values representing those encountered in the borehole rather than at values available from an air calibration which are outside of the range of those of the geological formations.

SUMMARY OF THE INVENTION

The present invention solves these problems by providing a method and apparatus for testing and calibrating electromagnetic logging tools at the well site. The preferred embodiment comprises metal enclosures for each antenna, containing means for detecting and/or generating magnetic fields within the enclosures, means for converting the magnetic fields into electrical signals and vise versa, further means for conditioning the electrical signals by phase shifting and/or attenuating them, and means for applying the conditioned signals to the receivers so as to test/calibrate the electromagnetic logging tool.

It is therefore an object of the present invention to provide a novel method and apparatus for repeatably calibrating an electromagnetic logging tool.

It is a further object of the present invention to provide a novel method and apparatus for repeatably testing an electromagnetic logging tool.

Another object is to provide a method and apparatus for calibrating or testing an electromagnetic logging device at a field or wellsite location.

Still another object is to provide a method and apparatus for calibrating or testing an electromagnetic logging device at a field or wellsite location without suffering interference from external electromagnetic sources or perturbations.

And yet another object is to provide a method and apparatus for calibrating or testing an electromagnetic logging device under conditions approximating those expected to be encountered during the actual subsurface use of the logging device in a borehole.

Other and further objects will be explained hereinafter and are particularly delineated in the appended claims.

BRIEF DESCRIPTION OF THE DRAWING

The invention will now be described with reference to the accompanying drawing, in which.

DESCRIPTION OF THE PREFERRED EMBODIMENT

Figure 1:
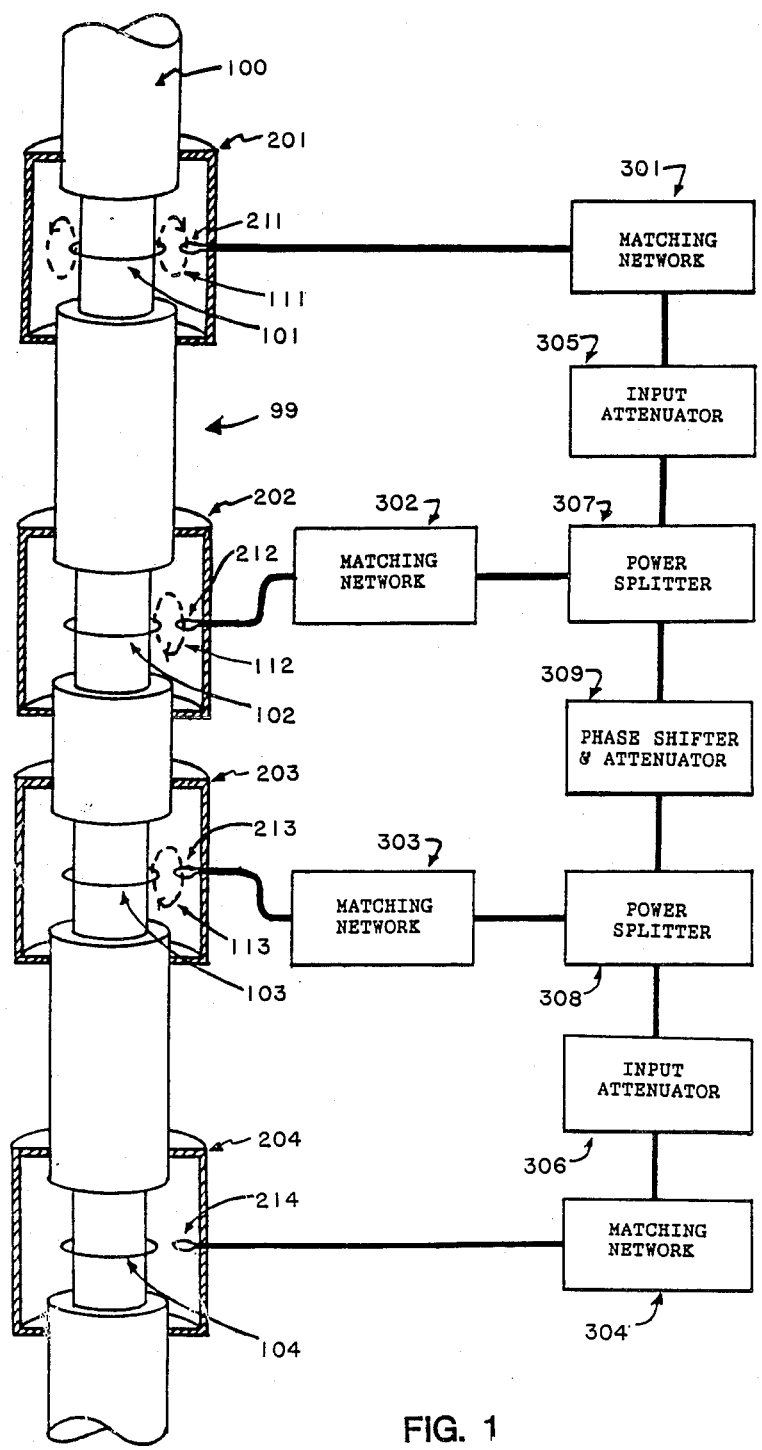
FIG. 1 is a graphical representation of an electromagnetic logging tool equipped with an embodiment of the present invention.

Referring now to FIG. 1, an electromagnetic logging tool 99 is shown and may comprise a wireline logging sonde or a logging while drilling tool formed in a drill collar. The logging tool contains an upper transmitter 101, an upper receiver 102, a lower receiver 103, and a lower transmitter 104 disposed along the length of an elongated cylinder 100. Additional transmitters and receivers may be present, but are not shown in FIG. 1 for simplicity. In a normal operating or logging mode, the transmitters alternately broadcast electromagnetic waves into the formation surrounding the borehole of an oil well. The electromagnetic waves penetrate into the formation and excite conduction currents and displacement currents in the formation. The phases and the amplitudes of the electromagnetic fields at the locations of the receivers are affected by these induced formation currents, so that the phases and/or the amplitudes of the signals detected by the receivers contain information about the electrical properties of the formation, such as its conductivity and relative permittivity. For example, the logging devices described in U.S. Pat. Nos. 4,209,747 and 4,511,843 measure the phase shift and the attenuation of the electromagnetic fields between pairs of receivers, which are inverted to obtain the conductivity and the relative permittivity of the formation.

In order to calibrate or test such electromagnetic logging devices, it is proposed to apply electromagnetic fields to the receivers that are representative of realistic downhole conditions. In order to assure consistent tests and calibrations from one time to another, the applied electromagnetic fields should be highly reproducible.

These objectives are obtained in part by providing metal enclosures 201, 202, 203, and 204 which are mounted over the transmitters and receivers. These metal enclosures are shown in cut-away view for clarity. These metal enclosures confine electromagnetic fields within themselves, and prevent any electromagnetic fields produced by the transmitters from directly reaching the location of the receivers without passing through the calibration circuitry shown to the right of the tool 99. In the preferred embodiment, these enclosures are metal cylinders closed at their ends. Preferably, the elongated cylinder forming the tool body (100) is a metal so that the enclosures have metal-to-metal contact with the logging tool 99. This ensures that the electromagnetic fields generated by transmitter 101 or 104 cannot reach receivers 102 or 103. In practice, enclosures 201, 202, 203, 204 can be made in half-cylinder pieces, with hinges and latches to facilitate easy mounting over the tool 99.

Each enclosure contains a secondary antenna 211, 212, 213, and 214 which receives or transmits electromagnetic fields. In the embodiment shown, the antennas 101, 102, 103, and 104 are coils as are the secondary antennas 211, 212, 213, and 214. In operation the logging tool's upper transmitter 101 generates a magnetic field 111. This magnetic field is confined within the metal enclosure 201. The secondary antenna 211 is a coil positioned to intercept the magnetic field within the enclosure, and a voltage is produced in the secondary coil proportional to the magnetic field strength 111. Similarly, the secondary coils 212 and 213 are driven by electrical currents, and produce secondary magnetic fields 112 and 113 at the locations of the receivers 102 and 103. These secondary magnetic fields are likewise confined within the respective enclosures at the receivers 202 and 203.

The same considerations apply to the logging tool's lower transmitter 104. In FIG. 1, the logging tool's lower transmitter is not shown broadcasting. This is appropriate for a situation where the upper and lower transmitters are alternately activated, and the measured phase shifts and attenuations measured between the two receivers are averaged to obtain a borehole compensated measurement.

When the logging tool's upper transmitter is activated, the magnetic field 111 induces an oscillating voltage in the secondary coil 211 and hence an electrical signal, which is transformed by the matching network 301 to provide a load which matches the impedance of the rest of the circuitry (e.g. 50 ohms). The output of the matching network 301 is an electrical signal proportional to the magnetic field 111. Connected to the output of matching network 301 is an input attenuator 305 which reduces the signal level to be commensurate with certain logging conditions. For example, for a test or a calibration representative of a formation with high resistivities, the input attenuator has a small value of attenuation. For a test or calibration representative of a formation with low resistivities, the input attenuator has a large value of attenuation. The resultant signal attenuation simulates the overall losses in a formation that would occur as a result of the formation's resistivity.

The signal from the input attenuator 305 next enters a power splitter 307 which sends part of the signal to the upper secondary coil 212 via the matching network 302, and sends part of the signal to the phase shifter and attenuator circuit 309. The phase shifter and attenuator circuit introduce specified phase shifts and attenuations representative of various formations. A high resistivity formation corresponds to a small phase shift and a small attenuation, while a low resistivity formation corresponds to a large phase shift and a large attenuation.

The resulting phase shifted and attenuated signal enters a second power splitter 308. Part of this signal enters the matching network 303 for the lower secondary coil 213, and part of the signal enters the lower input attenuator 306. Therefore, the signals delivered to the upper and lower secondary coils 212 and 213 have definite and pre-determined phases and amplitudes with respect to each other and with respect to the logging tool's upper transmitter field 111. The logging tool's measurements of these fields 112 and 113 are compared to the reference or calibration values. If the measurements fall within accepted tolerances, then the logging tool is prepared for the logging job. If the measurements fall outside accepted tolerances, then the logging tool is calibrated to agree with the known phase shift and attenuation, the data obtained from the logging run is corrected in accordance with the determined discrepancy between the measured values and the known phase shift and attenuation, or the tested tool is not used.

Figure 2:
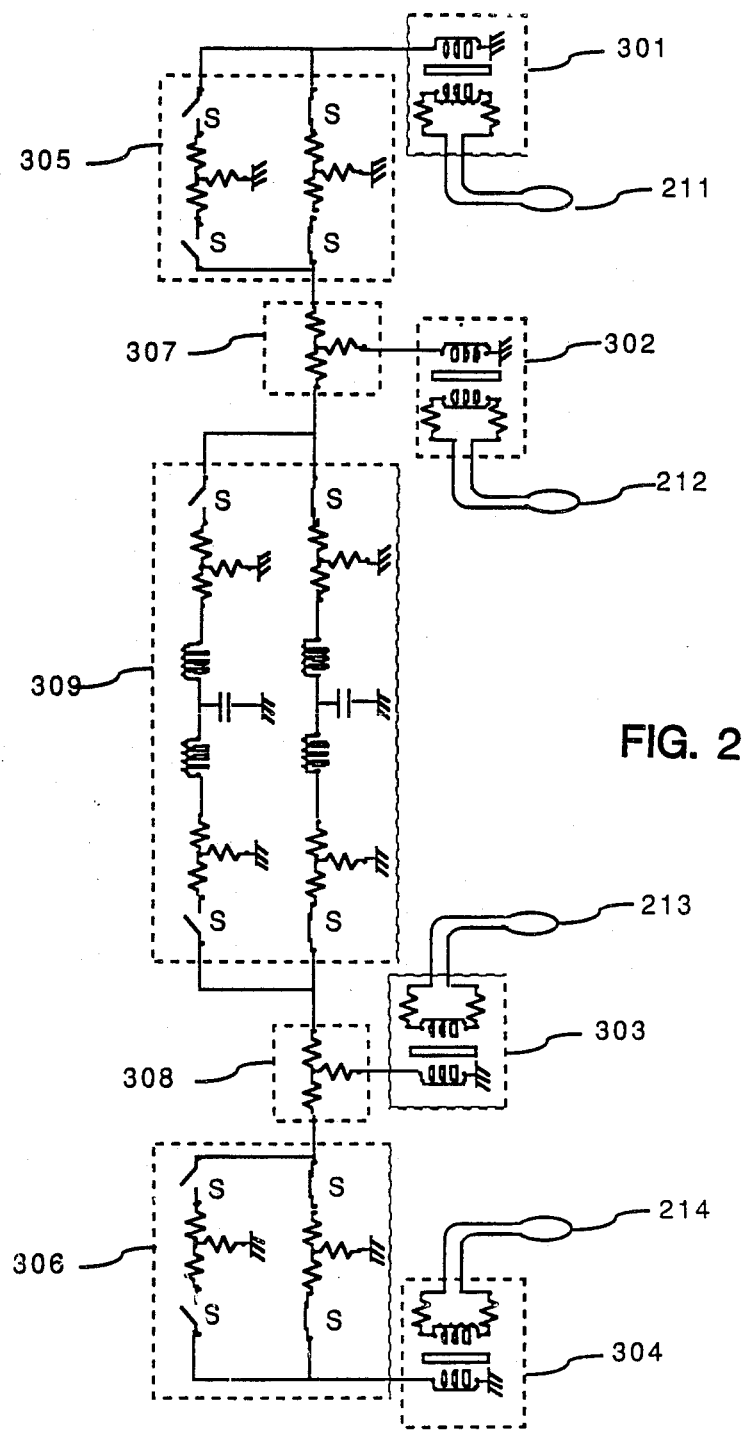
FIG. 2 is an electrical schematic of one circuit embodiment for practicing the invention.

Turning now to FIG. 2, one possible embodiment of the circuitry of the testing apparatus of FIG. 1 is shown. As can be seen, each of the attenuators 305 and 306, and the phase shifter and attenuator 309 are provided with an alternative branch which may be switched in or out of the circuit at will by means of switches S. This feature enables the same testing fixture to be used to test/calibrate with phase shifts and attenuations at both extremes of the range of formations expected to be encountered when the borehole is drilled. Alternatively, it would be possible to construct the circuits of FIG. 2 with variable components so that their adjustment would permit the testing/calibration of the logging tool at a number of phase shift and attenuation values.

I claim:

1. A method for testing an electromagnetic logging tool having a electromagnetic energy transmitting antenna and at least one longitudinally spaced electromagnetic energy receiving antenna, comprising the steps of:
    operating said tool to produce a primary magnetic field at said transmitting antenna;
    detecting the magnetic field produced by said transmitting antenna at its location and generating an electrical signal proportional to the field;
    modifying said electrical signal by a known amount to simulate the effects of propagation of electromagnetic energy through a geological formation to produce a modified electrical signal;
    generating a secondary magnetic field at the receiving antenna in response to said modified electrical signal;
    detecting said secondary magnetic field by said receiving antenna of said tool; and
    comparing the results of the detection of said secondary magnetic field by said tool to the known modification.

2. The method as claimed in claim 1 further including the step of calibrating said tool in response to comparison between the results of the detection of said secondary magnetic field to said known modification.

3. The method as defined in claim 1 further including the step of preventing any magnetic field except said secondary magnetic field from reaching said receiving antenna.

4. The method as defined in claim 1 further including the step of preventing any magnetic field except said primary magnetic field from being detected at the location of said transmitting antenna.

5. The method as defined in claim 1 further including the steps of surrounding each of said transmitting and receiving antennae with a conductive enclosure in order to isolate them from the surrounding environment and from each other.

6. The method as defined in claim 1 wherein said modifying step simulates phase modification of a transmitted electromagnetic signal propagating through a geological formation.

7. The method as defined in claim 1 wherein said modifying step simulates attenuation modification of a transmitted electromagnetic signal propagating through a geological formation.

8. An apparatus for testing an electromagnetic logging tool having an electromagnetic field transmitting antenna and at least one longitudinally spaced electromagnetic field receiving antenna, said apparatus comprising:
    a. means positioned in the proximity of said transmitting antenna for detecting a primary magnetic field generated by said transmitting antenna and generating a signal representative thereof;
    b. means coupled to said detecting means and responsive to said generated signal representative of the primary field for producing in the proximity of said receiving antenna a secondary magnetic field that simulates the transmitted electromagnetic field after it has propagated through a geological formation of known properties.

9. The apparatus as recited in claim 8 wherein said means for detecting the magnetic field generated by said transmitting antenna comprises a loop antenna sensitive to the magnetic field produced by the transmitting antenna.

10. The apparatus as recited in claim 8 further including a loop antenna for transmitting said secondary magnetic signal to said receiving antenna.

11. The apparatus as recited in claim 8 further including shielding means for preventing magnetic fields generated by said transmitting antenna from directly reaching said receiving antenna.

12. The apparatus as recited in claim 8 further including shielding means for preventing magnetic fields other than said secondary magnetic field from reaching said receiving antenna.

13. The apparatus as recited in claim 11 or 12 in which said shielding means comprises a metallic enclosure for mounting over an antenna.

14. The apparatus as defined in claim 8 wherein said logging tool includes first and second receiving antennae at different longitudinal spacings from said transmitting antenna and wherein said testing apparatus includes means responsive to said primary magnetic field for transmitting a secondary magnetic field to each of said receiving antennae, said apparatus including means for introducing a known phase shift and a known attenuation between the respective fields transmitted back to said first and second receiving antennae.

* * * * *